Dec. 1, 1970   L. L. SNEDDEN   3,544,165
TUNNELING BY LASERS
Filed April 18, 1967   2 Sheets-Sheet 2
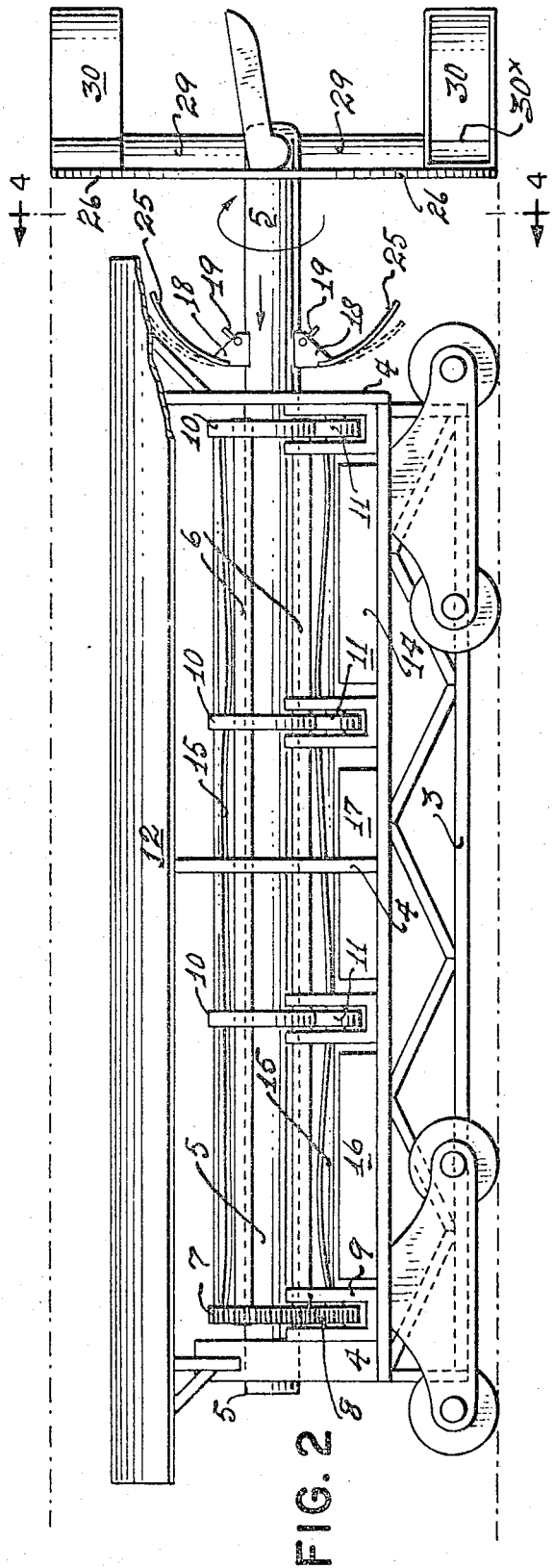
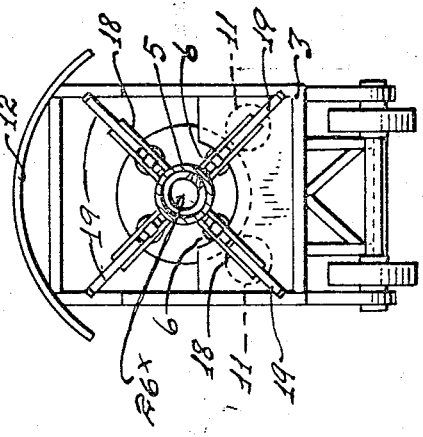
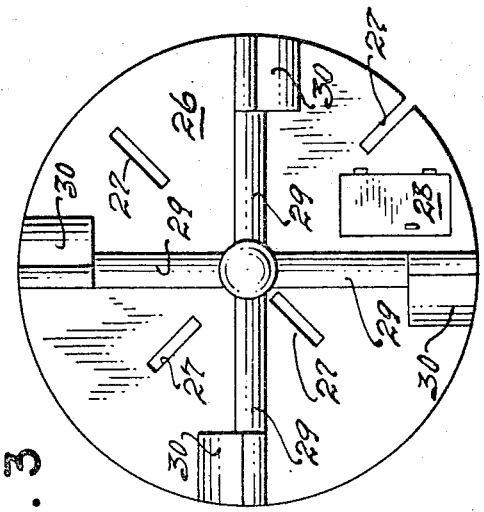
INVENTOR:
Louis L. Snedden
BY H. Lee Helms
ATTORNEY.

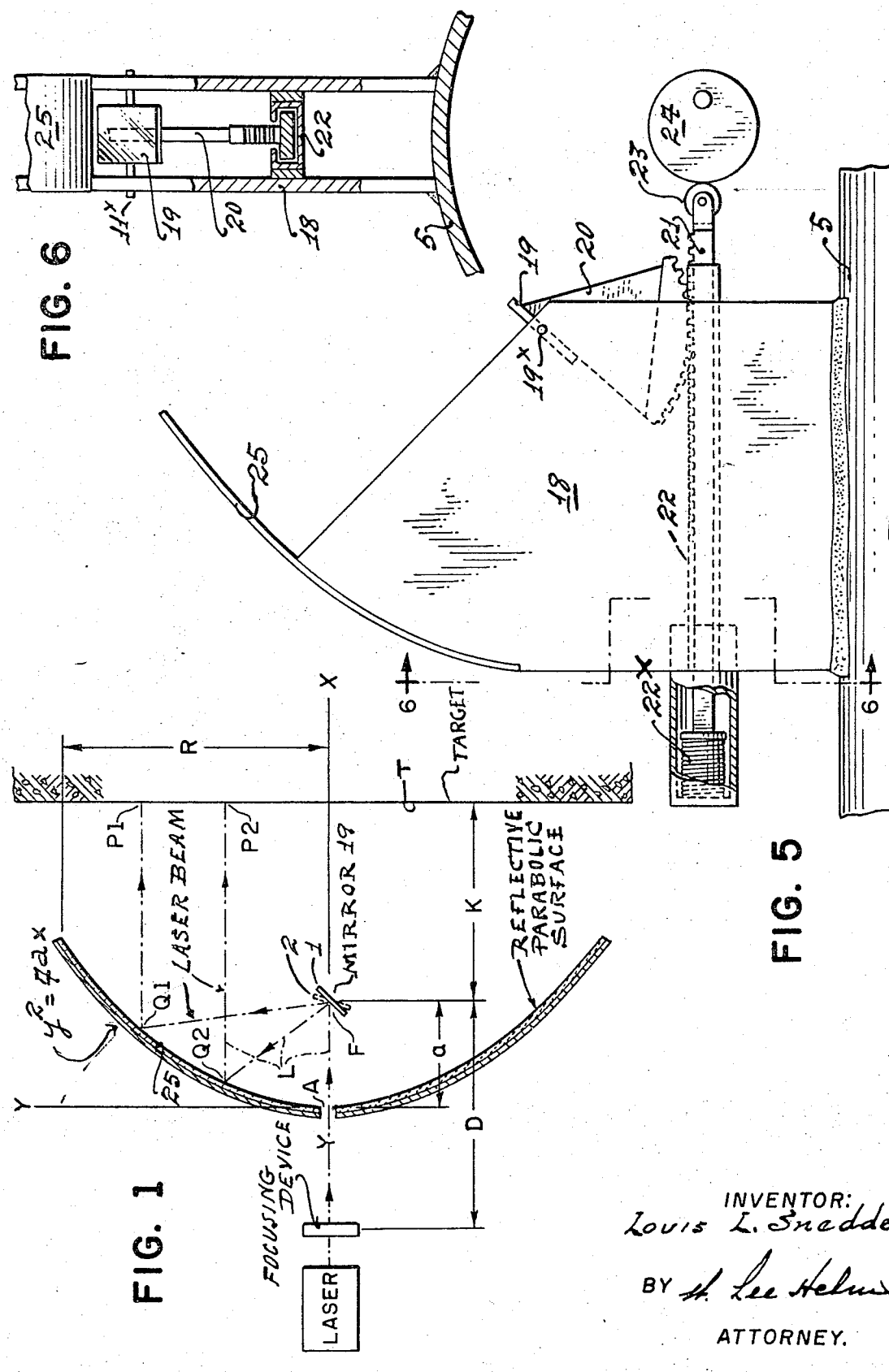

United States Patent Office 3,544,165
Patented Dec. 1, 1970

3,544,165
TUNNELING BY LASERS
Louis L. Snedden, Jacksonville, Fla., assignor to Mason & Hanger-Silas Mason Co., Inc., Lexington, Ky.
Filed Apr. 18, 1967, Ser. No. 631,733
Int. Cl. E21d 9/00
U.S. Cl. 299—14                                  7 Claims

ABSTRACT OF THE DISCLOSURE

The disclosure is directed to a method and apparatus for tunneling in rock by means of a laser beam. A movable support carries both a forwardly directed laser device and a parabolic mirror. An adjustable mirror is carried by the support in a position to intercept the laser beam and reflect the beam onto the parabolic mirror from which the beam is reflected onto selected areas of the tunnel face. By the disclosed arrangement the movement of the beam on the tunnel face can be carried out while the path length of the beam is maintained constant.

---

For tunneling and rock removal, the present invention employs at least one laser with a device which will maintain the beam in focus while changing its position on a target plane, viz. the face of a surface, including a rock surface, to be tunneled. The laser beam is directed from a point rearwardly of a paraboloid member and strikes an adjustable mirror and by it is directed away so that it strikes the reflective surface of the paraboloid member. The beam is then directed parallel to its initial axis and upon the "target," i.e. the face of the area to be tunneled. The beam may be directed toward and through the paraboloid reflective member which may have a hole or transparent area at its apex for the passage of the laser beam, and which will have its inner surface highly reflective.

By adjustment of the mirror, the laser beam will strike the "target" surface at a given area, and when the position of the mirror is angularly changed, the laser beam will strike the paraboloid and hence the "target" surface at different areas. In either case the path-length of energy from the point of focus to the "target" will be constant and equal to the distance thereof from the mirror to the paraboloid reflector in a given adjustment to the mirror, so that a constant focal length is maintained from the point of focus to any point on a given "target" plane.

By continual change of the angular position of the mirror, a complete line of points can be radiated with laser energy. Further, by rotating the mirror and paraboloid reflector simultaneously, a circle of laser energy will be described on the "target" plane. Combining changes in the angular positions of the mirror, with said rotation will result in radiating all points on the "target" plane over a given radius.

The embodiment shown in the drawings provides for the said adjustments and rotation; for forwardly moving the assembly of elements by means of a carriage; for automatically removing spoil from the face being tunneled; and for cooling the laser members. In said embodiment a plurality of spaced lasers are shown for bodily rotation about a common axis.

The invention will be described with reference to the accompanying drawings, in which:

FIG. 1 is a schematic view, showing the position of a laser, a focusing device, a parabolic mirror through which the laser beam passes to an adjustable mirror, and indicating path lengths of the laser beam to the target plane by adjustment of the mirror.

FIG. 2 is a view in elevation, showing a carriage which carries an embodiment of the invention.

FIG. 3 is a view in elevation of the heat shield, provided with openings for the passage of laser beams.

FIG. 4 is a vertical section taken on the line 4—4, FIG. 2, looking in the direction of the arrows.

FIG. 5 is a vertical view in partial section showing the reflector adjustment mechanism.

FIG. 6 is a vertical view in partial section taken on line 6—6 of FIG. 5 looking in the direction of the arrows.

In the carriage-mounted embodiment of the invention illustrated, as shown particularly at FIG. 2, a carriage is employed, generally indicated at 3, provided with suitable vertical supports as indicated at 4. The supports in practice will have bearing apertures for a rotary tube 5. Carried by the tube for rotation is a laser bank which preferably consists of four lasers, two being indicated at 6, FIG. 2.

Any suitable means may be provided for rotating tube 5 and for supporting it at and between its ends. In FIG. 2 the tube carries a driven gear 7 in mesh with a drive gear 8 mounted on a shaft on bracket 9 which will lead to a power device such for example as a suitable electrical motor, the latter not being shown in the drawing. In the present embodiment, the tube carries ring supports 10, on rollers 11 which may be carried on stub-shafts in suitable brackets carried by the carriage.

Again referring to FIG. 2, the top of the carriage is provided with a protective shield 12, to prevent damage caused by any falling aggregates from the tunnel. The carriage also is provided with a suitable electrical power source or inlet to the lasers and the motor for the drive gear 8, as indicated at 14. The carriage also is provided cryogenic vessels for cooling the lasers, as indicated at 15, and which will, in practice, communicate with a coolant compressor at 16, together with a coolant condenser as indicated at 7. The communication ducts between the cryogenic vessels, the compressor and the condensor have not been shown, because such suitable arrangements are obvious to those skilled in the art.

Carried by brackets 18, on tube 5, are driven plane-reflectors 19, in line with the lasers 6. As shown more particularly in FIGS. 5 and 6, brackets 18 consist of spaced plates between which, in each case, a plane reflector 19 is disposed. The reflector is carried by a quadrant-gear 20, in mesh with a rack-bar 21. The rack bar is guided in a channel member 22, and at its rear end it is engaged by a spring $22^x$, in order to maintain constant pressure between its roller 23 and a driven excentric 24. The quadrant-gear 20 is pivoted on its bracket by a pivot pin $19^x$. Excentric 24 serves to adjust the reflector 19 to desired angular positions, and the excentric may be driven by any suitable means, as, for example, by connection with the shaft of a motor of low power.

Referring to FIGS. 2 and 5, it will be seen that each quadrant gear 20 has an upward extension which carries the plane reflector, in line with a parabolic reflector 25.

Reference to FIG. 4 will clarify the arrangement just described, although that figure is merely schematic, particularly as to the spacing of the bracket plates and the width of the reflector 19.

Forwardly of the parabolic reflector 25, in each case, tube 5 carries a heat shield 26, FIG. 3, formed with suitable openings, as schematically indicated at 27, and an access door may be provided as indicated at 28.

For tunneling, a developed powerful laser will be employed, as for example, a continuous laser beam, effected by a gas laser. However, the specific form of the laser employed is not the subject of the present invention, and may be as desired, including those produced as the laser art develops.

In the present embodiment, the tube 5 has within it a screw feed for spoil-aggregate removed from the face being excavated, and as indicated at $26^a$, FIG. 4. Thus the tube 5 and the screw therein serves as conveyor means to carry the spoil material to a discharge point at the rear of the tube and at which the spoil material can be removed in the manner desired, as for example by a belt feed (not shown). The tube with its screw conveying means receives such material to be discharged, in the following manner:

Mounted on the front end of tube 5, forwardly of shield 26$^x$, is a receiving tube assembly arranged to discharge into tube 5. In FIG. 3, four of the said spoil conveyor tubes are indicated at 29. The inner end of each tube 29 communicates with the interior of tube 5 and hence with its screw feed. At the outer end of each tube 29 is a scoop pickup 30, each of the latter having an opening in its lower end which communicates with an appropriate tube 29, one opening being indicated at 30$^x$ in FIG. 2. Thus during the rotation of tube 5, spoil will be picked up by the successive scoops 30 and at each scoop rises toward the vertical, the spoil will pass downwardly through opening 30$^x$; thence into the appropriate tube 29, from which it will fall into the tube 5 for action by the screw feed 26$^x$.

Returning to FIG. 1, the latter illustrates how my invention will maintain a laser beam in focus while quickly changing its position on a "target" plane. The paraboloid reflector 25 is plotted in the $x$–$y$ plane with its apex at the intersection of the ordinate and abscissa. The equation for the parabola thus shown is: $y^2 = 4ax$ where $a$ is the distance from the apex A to the focal point F.

As stated in the foregoing part of the specification, a hole or window is shown at the apex, and a plane reflecting mirror 19 is shown at the focal point. The inner surface of the paraboloid is reflective and the target is located a distance K from the focal point. The laser device is directed through a focusing member which is located a distance D from the focal point of the paraboloid. The laser beam passing from the focusing device and through the paraboloid reflector strikes the mirror 19 at point F and is then directed away in the $x$–$y$ plane and strikes the parabolic surface of the reflector at point $Q^2$. The beam is then directed parallel to the $x$-axis to the target plane T, striking the "target."

With the mirror in position 1, the beam will strike the parabolic surface at $Q^1$ and the "target" at point $P^1$. With the mirror rotated to position 2, the beam will strike the parabolic surface and "target" at points $Q^1$ and $P^2$, respectively. In either case, the path length L of the laser beam from the focusing device, will be the same, and in fact with be $L = D + K + 2a$. It is evident that for the parabola of FIG. 1, any position of the mirror which causes the laser beam to strike a point on the parabolic surface, will result in a path-length of energy from the focusing device to the "target" plane which is constant and equal to the length L. Thus the invention is operative to maintain a constant focal length from a focusing device to any point on a given target plane. By operating the elements to continually change the angular position of the mirror, a complete line of points can be radiated with laser energy; and further, a circle can be described on the "target" plane. A combination of changing the angular position of the mirror coupled with rotation about its axis will result in radiating all points on the target plane over a given radius.

A substitution from a solid paraboloid to a narrow parabolic strip will permit radiation of a line on the target by angular changes in the mirror's position. Further, if the mirror and the parabolic strip are rotated about the $x$-axis together, a circle will be described on the target plane. Again, coupling change in angular position with rotation about the $x$-axis will result in total radiation to the target plane over a radius R.

By properly matching the power and number of lasers to the size of the tunnel shaft and the rate of advancement desired, the entire device would be moved forward at a prescribed speed. Spoil would be deposited behind the machine on a conveyor system for transfer to a spoil bank. Cooling could be accomplished by various methods, the expected highest temperatures being at the laser itself rather than at the surface being radiated.

The reflective surfaces of the parabolas and mirrors may be formed in one of many various ways. One particularly efficient method being the vacuum deposition of many layers of dielectric materials, each having different indices of reflection. Reflectors having efficiencies in excess of 99% may so be constructed.

It will be understood that various changes may be made in the form and arrangements of the elements forming the embodiment illustrated. For example, should it be desired to adjust the reflector relatively to the mirror this is within the spirit of the invention as a modification. A reason for FIG. 1, in illustrating the passage of the laser beam through the beam passage A of the reflector, is for enabling radiation of a complete line of points on the target plane, and the mirror may have adjustment to throw the beam from terminous to terminous of the reflector. As indicated in FIG. 5 the reflector may have a terminous somewhat above (or below) the axis of the beam, if desired, for more limited range.

Having described my invention, what I claim and desire to secure by Letters Patent is as follows:

1. A method of tunneling employing a laser, which comprises producing a laser beam, directing the beam in a path extending reversely of the reflecting face of a parabolic reflector, thence upon a mirror device focused to transmit the beam to the front of said reflective face of the reflector, thence directing the beam to an area on the face to be tunneled, simultaneously bodily moving the laser, the reflector and the mirror device in an arcuate path, and successively relatively moving the reflector and mirror device to change the path of the beam on the tunnel face.

2. An apparatus for tunneling, employing a laser beam, consisting of a movable support, a parabolic reflector on said support and a laser on said support and disposed rearwardly of said reflector and adapted to project a beam in a path directed forwardly of the reflector, a mirror on said support and in said path, means for adjusting said mirror to direct the beam rearwardly and upon selected reflecting areas of the reflector whilst maintaining constant the path length of the beam, and means for rotating said support to bodily and simultaneously move the laser, the mirror device and the reflector in an arcuate path.

3. An apparatus for tunneling constructed in accordance with claim 2, in which the parabolic reflector is formed with a beam passageway and the mirror is adapted to project the laser beam to opposite sides of said passageway.

4. An apparatus for tunneling constructed in accordance with claim 2, in combination with a carriage, in which the rotary support extends longitudinally of a carriage, on which it is mounted, a bank of spaced lasers on the rotary member and, forwardly thereof, a parabolic reflector, and a mirror for each reflector, power means for turning said rotary member, and power means for adjusting each mirror.

5. An apparatus for tunneling in accordance with claim 2, in which the rotary member is tubular, a heat shield carried by the rotary member and having laser beam passageways, a plurality of scoops on said heat shield, conduits between each scoop and the interior of said tubular rotary member, and conveyor means in the tube for feeding scooped material toward the rear end of the tube.

6. An apparatus for tunneling constructed in accordance with claim 2, in which the laser extends on and longitudinally of the rotary member, of cryogenic vessels adjacent the laser and communicating with at least one coolant condenser and a compressor, and power means on the carriage for flow-operation of coolant media for said cryogenic vessels.

7. An apparatus for tunneling constructed in accordance with claim 2, in which the mirror is pivoted on a carrier which holds the parabolic reflector and which carrier is connected to the rotary member, and means for swinging the mirror on its pivot.

References Cited

UNITED STATES PATENTS

| | | | |
|---|---|---|---|
| 213,789 | 4/1879 | Du Motay et al. | 299—14 X |
| 1,284,398 | 11/1918 | McKinley | 299—14 X |
| 1,462,997 | 7/1923 | Anderson | 299—56 |
| 3,206,548 | 9/1965 | Ogland | 178—7.88 |
| 3,388,314 | 6/1968 | Gould | 331—94.5 X |

FOREIGN PATENTS 147,980   1962   U.S.S.R.

ERNEST R. PURSER, Primary Examiner

U.S. Cl. X.R.

175—15, 16; 219—121; 331—94.5